F. DICK, Jr.
AUTOMOBILE LAMP SUPPORT.
APPLICATION FILED JUNE 26, 1916.
1,264,619.
Patented Apr. 30, 1918.
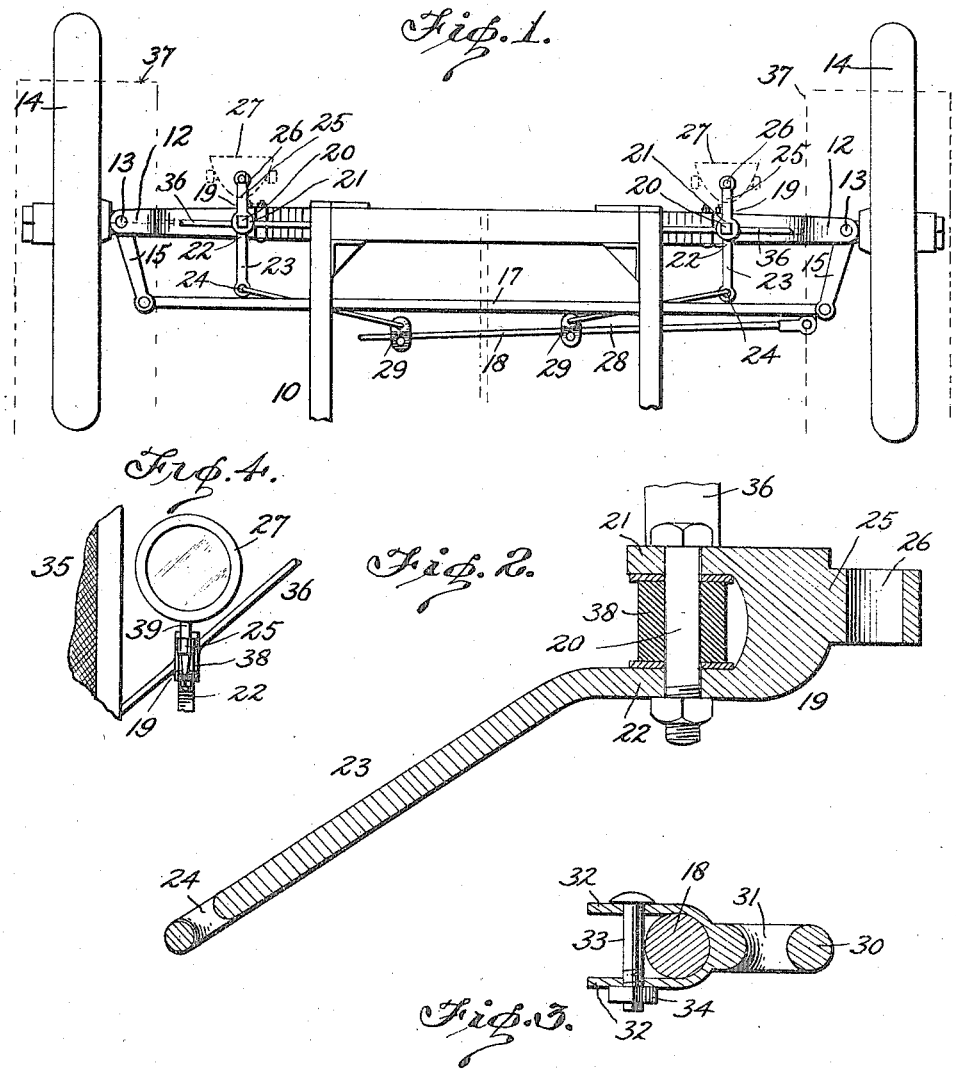
INVENTOR
Ferdinand Dick Jr.
WITNESSES
BY
ATTORNEY

UNITED STATES PATENT OFFICE.

FERDINAND DICK, JR., OF FULTS, ILLINOIS.

AUTOMOBILE-LAMP SUPPORT.

1,264,619.  Specification of Letters Patent.  Patented Apr. 30, 1918.

Application filed June 26, 1916.   Serial No. 105,982.

*To all whom it may concern:*

Be it known that I, FERDINAND DICK, Jr., a citizen of the United States, residing at Fults, in the county of Monroe and State of Illinois, have invented certain new and useful Improvements in Automobile-Lamp Supports, of which the following is a specification.

This invention relates to a swinging support for automobile head lights, and has for its object to provide a support for each headlight pivotally mounted at the front of the car and adapted to be turned to the right and left in synchronism with the turning of the wheel when steering.

A further object of the invention is to provide such a pivotal lamp support with means for connecting the same to the steering rod connection that leads from the lower end of the steering wheel shaft to turn the front wheels laterally in guiding the automobile, which connecting means causes the lamps to swing with the front wheels and illuminate the roadway in the direction over which the car is to travel.

A still further object is to so mount and connect such pivotal lamp supports upon the car and connect said supports to the steering connecting rod in such manner that both lamps will turn synchronously to the right or left as the automobile is turned in the same direction.

With these and other objects in view the invention consists in the novel construction and arrangement of parts hereinafter described and illustrated in the accompanying drawings, in which—

Figure 1 is a plan view of the front portion of an automobile chassis with the improved lamp steering mechanism in position thereon, Fig. 2 is a vertical longitudinal sectional view of the swinging lamp supporting bracket, Fig. 3 is a similar view of the clip that connects the steering rod with a link leading to the lamp bracket, and Fig. 4 is a detail view of the lamp and lamp bracket mounted on the ordinary lamp support of a Ford automobile, as seen from the front.

Referring to the drawing, 10 is an automobile chassis mounted in the usual manner on the front axle 11 having a yoke 12 on each end in which is pivoted on a vertical pin 13, the short shaft of a front wheel 14. The front wheel shafts 14 are each provided with a rearwardly extending arm 15 pivotally connected together by a cross link 17 so that the two wheels when turned on their vertical axis 13 will move in unison.

Pivoted at one end to the link 17 near one of the arms 15 or to said arm is a rod 18 that extends transversely of the machine and connected at its other end to the lower end of the steering wheel shaft in the usual manner which, being understood, it is not thought necessary to illustrate. Whenever the steering wheel is turned either to the right or left, the connecting rod 18 is moved longitudinally and deflects the front wheels 14 so as to turn the automobile in the direction desired.

On each side of the motor casing 35, and above the front axle 11, in the type of automobile shown, is a brace rod 36 that extends upwardly and outwardly from the body of the car to support the forward end of the front wheel mud guard 37. Intermediate the ends of each brace rod 36 is a socket 38 having a vertical bore therethrough that in present use supports the stem 39 of a head-lamp 27. These lamps are removed when this invention is to be applied, and on each socket 38 is mounted a lamp bracket 19 by a vertical pivot 20 passing through an ear 21 that projects rearwardly from the top of the bracket body and also through an arm 22 that extends from said body under said socket and rearwardly for a suitable distance, said arm being inclined downwardly just behind the pivot 20, as at 23, and has a perforation 24 in its extremity. On the front of the bracket 19 is a projection 25 formed with a vertical opening 26 therein to receive the downwardly projecting stem 39 that is usually formed on the under side of the head-light 27.

Connected to the eye or perforation 24 at the end of the bracket 19 is a link 28, said links extending toward the center line of the automobile near which they are connected to the steering bar 18 by clips 29. Each clip comprises a forwardly projecting lug 30 having a perforation or eye 31 therein for the inner end of the link 28 and a rearwardly extending fork 32, the fingers of which pass on opposite sides of the connecting rod 18 and are clamped thereto by means of a bolt 33 and nut 34 on the end of the bolt. By means of this connection the clips 29 may be secured at any point on the connecting rod 18 to suit the length of the link 28 so that if one of these links should be longer than the other, the clip can be moved on the rod in position to suit its length. As thus constructed, when the steering wheel of the automobile is turned in a direction to move the connecting rod 18 to the right, the clips 29 on said rod will, through the link 28, swing the arms 23 of the lamp-supporting brackets 19 in the same direction. The projections 25 on said brackets being on the opposite side of the pivots 20 will move to the left carrying the headlights 27 in the same direction and deflecting them so as to throw the light upon the road in the direction in which the automobile is turned. It is to be understood that the same movement of the connecting rod 18 actuates the wheels 14 through the arms 15 and turns them to the left to steer the car in that direction. A reverse movement of the steering rod 18 will, of course, turn the wheels 14 and headlights 27 to the right.

I claim:

In a vehicle having mud guards for the front wheels, a brace rod for each of said mud guards formed with a socket intermediate its ends having a vertical aperture therethrough, a swinging lamp supporting bracket comprising a body portion having an opening therethrough, a forward projection for the attachment of a lamp, and two spaced parallel arms extending in one direction from the body to span and be pivotally connected to the brace rod socket, and an extension downwardly and rearwardly of one of said parallel arms for connection to the vehicle steering means.

In testimony whereof I affix my signature in presence of two witnesses.

FERDINAND DICK, Jr.

Witnesses:
 GEORGE O. JOBB,
 LOUIS SCHILLING.

Copies of this patent may be obtained for five cents each, by addressing the "Commissioner of Patents. Washington, D. C."